S. HARTSHORNE.
Potato-Diggers.

No. 199,063. Patented Jan. 8, 1878.

WITNESSES:
C. Neveux
J. H. Scarborough

INVENTOR:
S. Hartshorne
BY
ATTORNEYS.

UNITED STATES PATENT OFFICE.

SHREVE HARTSHORNE, OF BORDENTOWN, NEW JERSEY.

IMPROVEMENT IN POTATO-DIGGERS.

Specification forming part of Letters Patent No. 199,063, dated January 8, 1878; application filed June 4, 1877.

*To all whom it may concern:*

Figure 1:
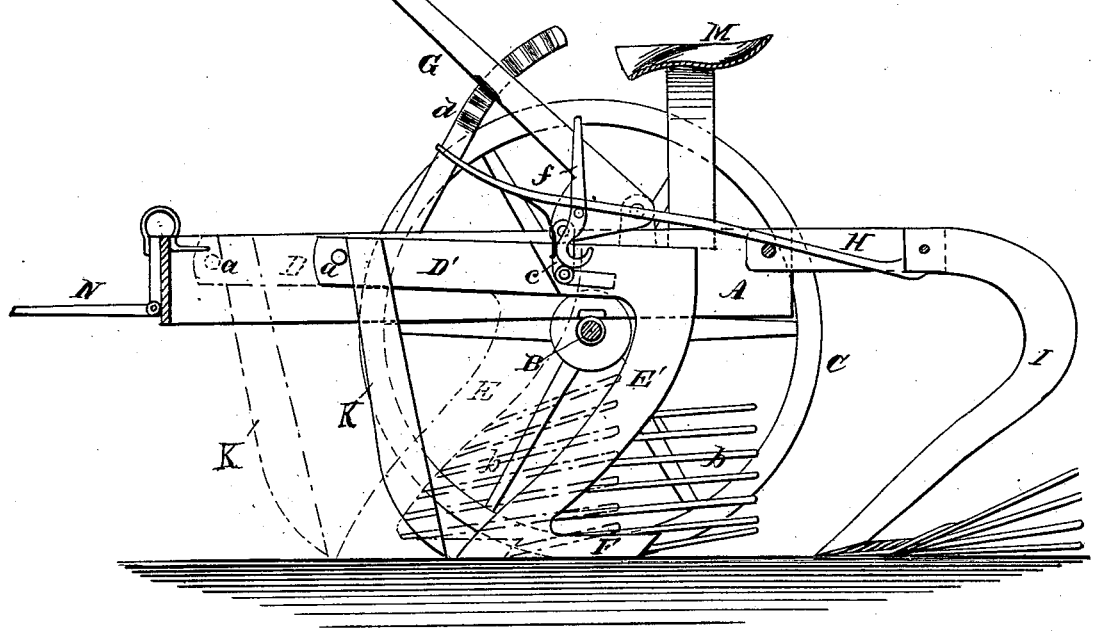
Figure 2:
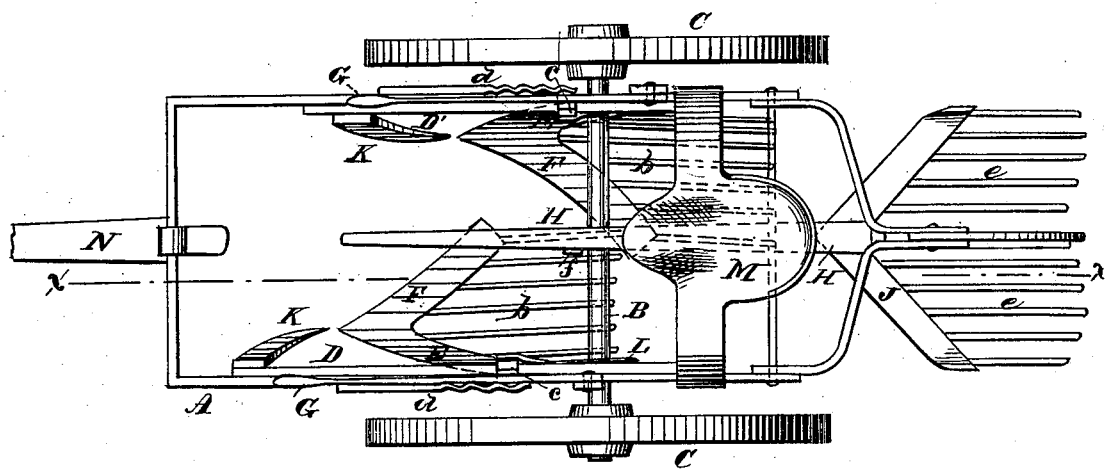

Be it known that I, SHREVE HARTSHORNE, of Bordentown, in the county of Burlington and State of New Jersey, have invented a new and Improved Potato-Digger, of which the following is a specification:

Figure 1 is a side elevation, in section, on line $x\ x$ in Fig. 2. Fig. 2 is a plan view.

Similar letters of reference indicate corresponding parts.

The object of my invention is to provide a potato-digger that will remove potatoes from the ground, separate them from the earth, and deliver them in compact rows on the surface of the ground.

In the drawing, A is a rectangular frame, secured to the axle B, which is supported by the wheels C. To the inner surface of the side pieces of the frame A plow-beams D D' are attached by means of bolts $a$, which form pivots, upon which the beams may swing up and down. The beams are provided with standards E E', to the lower ends of which the shares F are attached. One of these shares is right hand and the other left, and they both extend inward toward the center of the machine. The standard E of the beam D is placed in front of the axle B, and the standard E' of the beam D' is placed behind the axle, so that one of the shares runs in advance of the other. The object in this arrangement is to prevent the clogging or wedging of earth between the shares. A number of rods, $b$, are attached to the rear edge of the shares and extend rearward, converging slightly toward the center of the machine. Levers G are pivoted to the sides of the frame A, and connected with the beams D D' by connecting-rods $c$. These levers are provided with projections that spring into notches in the curved bars $d$, and hold the levers in any required position. At the rear of the machine a beam, H, is pivoted, which is provided with the standard I, to which is attached a double share, J, the ends of which curve upward. Rods $e$ project rearwardly from the rear edge of this share, and converge slightly. A spring-catch, $f$, is pivoted to the forward end of the beam H, and is capable of engaging the axle B when it is desired to raise the share J from the ground. Colters K are secured to the beams D D' in front of the standards E E', for clearing the ground of vines and for cutting the earth. A land-side, L, is attached to each of the standards E E', to guide and support the share. The machine is provided with a seat, M, for the driver, and a tongue, N, for horses.

The operation of the machine is as follows: The shares F are drawn through the earth at a sufficient depth to pass under the hills of potatoes. The foremost share loosens and partly elevates the earth, and the rear share elevates it still farther, and as it passes over the rods $b$ it drops between the rods and becomes separated from the potatoes. If the earth is of such a nature that the separation of the earth and potatoes is sufficiently complete the share J and its supports may be dispensed with; but in some kinds of earth the said share will be required, and it is so contrived that it will run close to or a little under the surface of the ground, and will lift the potatoes and throw them together in a compact row.

Having thus described my invention, I claim as new and desire to secure by Letters Patent—

The combination, in a potato-plow digger, of the two sifter-plows F $b$ F $b$, concaved to turn the soil inwardly, and set one in advance of the other, with a central double concave sifter-plow in the rear thereof, as and for the purpose specified.

SHREVE HARTSHORNE.

Witnesses:
LOUIS C. GERLACH,
JOHN HOLLOWAY.